Aug. 12, 1952 — B. LAMBERGER — 2,606,373
DEVICE FOR DISPLAYING COLOR COMPONENT AND FOR
CHANGING THE COLOR AT WILL
Filed Dec. 15, 1948 — 3 Sheets-Sheet 1

INVENTOR.
BRUNO LAMBERGER
BY
Clark & Ott
ATTORNEYS

Aug. 12, 1952      B. LAMBERGER      2,606,373
DEVICE FOR DISPLAYING COLOR COMPONENT AND FOR
CHANGING THE COLOR AT WILL
Filed Dec. 15, 1948      3 Sheets-Sheet 2
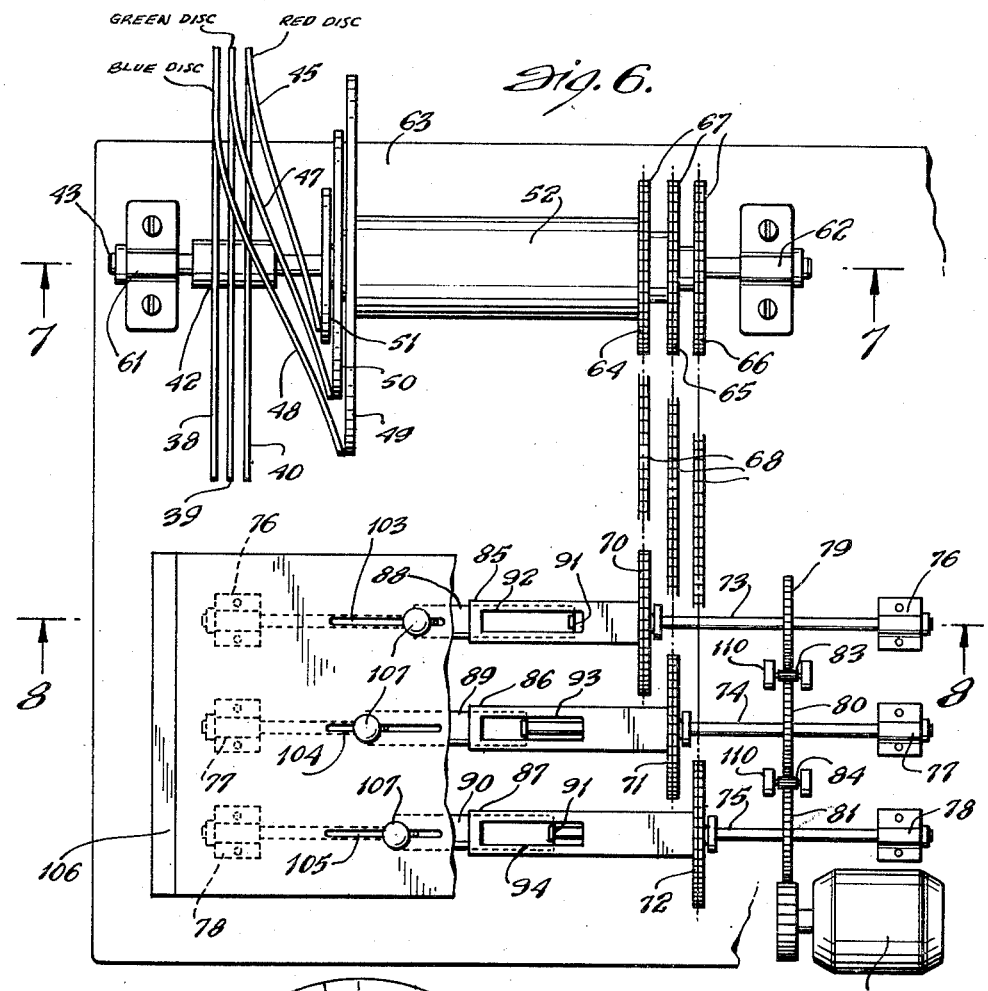
INVENTOR.
BRUNO LAMBERGER
BY
Clark & Ott
ATTORNEYS Aug. 12, 1952    B. LAMBERGER    2,606,373
DEVICE FOR DISPLAYING COLOR COMPONENT AND FOR
CHANGING THE COLOR AT WILL
Filed Dec. 15, 1948           3 Sheets-Sheet 3
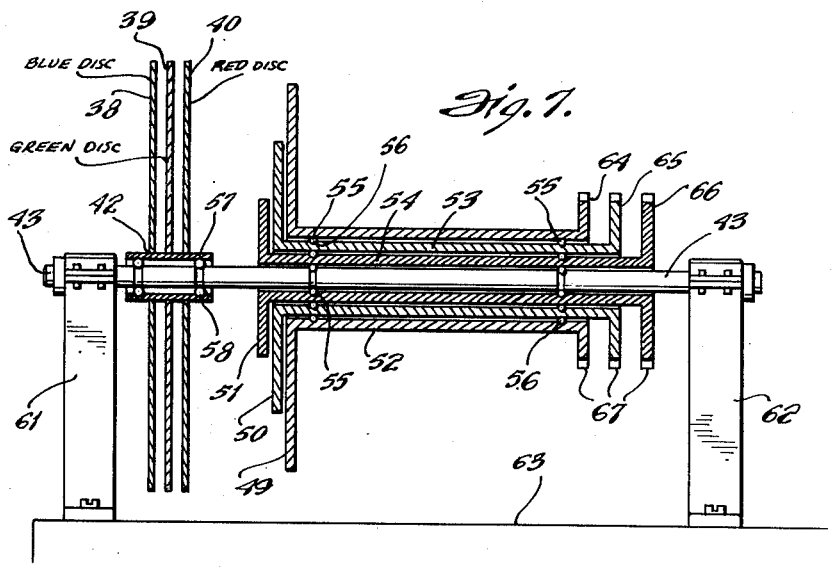
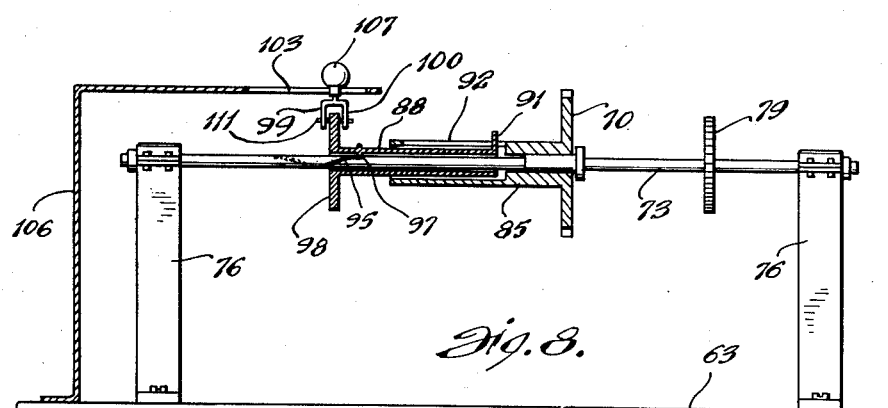
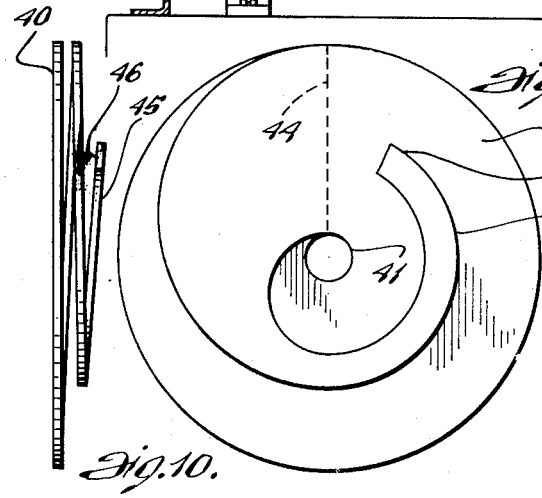
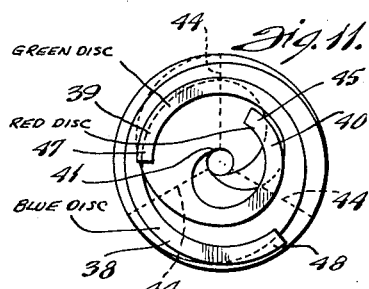
INVENTOR.
BRUNO LAMBERGER
BY
Clark & Clark
ATTORNEYS Patented Aug. 12, 1952

2,606,373

UNITED STATES PATENT OFFICE 2,606,373

DEVICE FOR DISPLAYING COLOR COMPONENT AND FOR CHANGING THE COLOR AT WILL

Bruno Lamberger, New York, N. Y.

Application December 15, 1948, Serial No. 65,376

3 Claims. (Cl. 35—28.3)

This invention relates to devices for visually displaying the component of a plurality of colors or shades and the invention has particular reference to an improved device for changing the color or shade at will and in rapid succession if desired.

The invention comprehends a device consisting of a plurality of discs of different colors or shades or having sectors of different colors or shades which discs are mounted on a shaft for turning movement and are adapted to be arranged to dispose portions of the discs outermost whereby turning of the discs will present a visual display of the component of the colors or shades of the outermost portions of the discs. An object of the invention is to provide a device of said character having means for relative adjustment of the discs on the shaft during rotation thereof so as to present relative portions thereof to view to thereby permit of the changing of the visual component color or shade of the portions of the discs arranged outermost without stopping rotation of the discs.

Another object of the invention is the provision of means for setting the discs in any desired adjusted relation on the shaft during rotation thereof.

Still another object of the invention is the provision of a device of said character in which the discs are provided with stop means for limiting the relative movement of any one of the discs with reference to a disc adjacent thereto to retain the several discs in assembled relation.

Still another object of the invention is the provision of resilient tongues for arresting the rotation of any one of the discs for disposing the same in relative adjusted relation on the shaft.

With the foregoing and other objects in view, reference is now made to the following specification and accompanying drawings in which the preferred embodiments of the invention are illustrated.

In the drawings:

Fig. 5 is a front view of the assembled discs.

Fig. 6 is a top plan view of a modified form of device for displaying the component of a plurality of colors or shades on the faces of discs mounted for rotation and constructed in accordance with the invention.

Fig. 7 is a vertical sectional view taken approximately on line 7—7 of Fig. 6.

Fig. 8 is a vertical sectional view taken approximately on line 8—8 of Fig. 6.

Fig. 9 is a rear view of one of the discs.

Fig. 10 is a side view thereof.

Fig. 11 is a rear view of the assembled discs.

Figure 1:
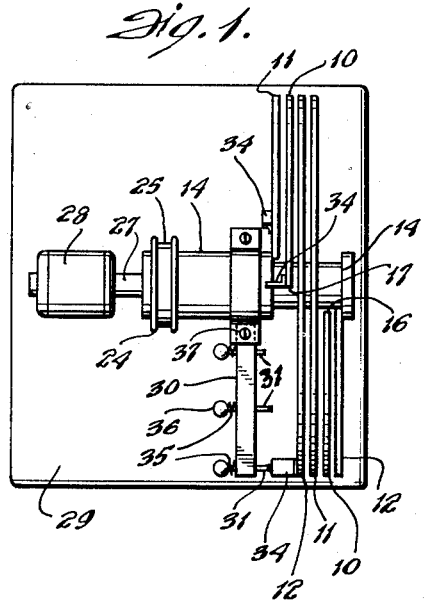
Fig. 1 is a top plan view of a device for displaying the component of a plurality of colors or shades on the faces of discs mounted for rotation and constructed in accordance with the invention.
Figure 2:
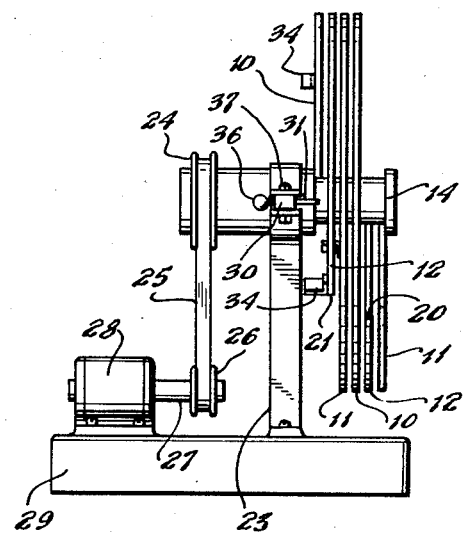
Fig. 2 is a view in side elevation thereof.
Figure 3:
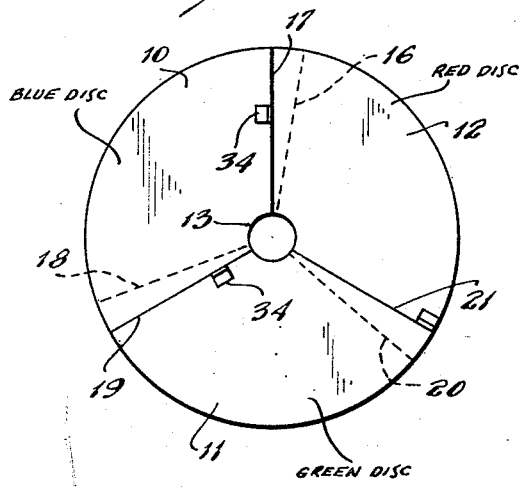
Fig. 3 is a rear view of the assembled discs.
Figure 4:
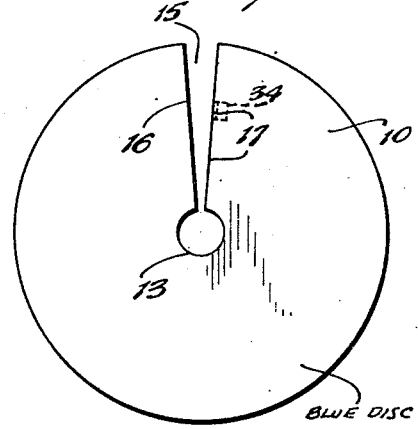
Fig. 4 is a front view of one of the discs.

Referring to the drawings by characters of reference, and more particularly to the form of the invention illustrated in Figs. 1 to 5 inclusive, the device consists of a plurality of discs, three being shown in the present embodiment indicated by the reference characters 10, 11 and 12 respectively which are provided with any desired color or shade on the outer face thereof such as blue, green and red respectively as indicated in the drawings.

The discs are centrally apertured as at 13 and are mounted on a shaft 14 for rotation therewith by frictional engagement with the shaft but which permits of the relative movement of the discs with respect to the shaft and to each other. The discs may constitute a complete annulus or as illustrated each of the discs may have a narrow sector removed to provide an opening 15 which extends from the outer periphery of the central opening 13. As illustrated, the opening 15 in the disc 10 is defined by the leading edge 16 and the trailing edge 17 thereof, while in disc 11 the said opening 15 is defined by the leading edge 18 and the trailing edge 19 thereof and in the disc 12 the same is defined by the leading edge 20 and the trailing edge 21 thereof.

The discs are mounted on the shaft 14 so as to dispose a portion of the forward colored face of each of the discs outwardly as shown in Fig. 5 of the drawings. As illustrated substantially equal arcuate sectors of the discs are shown outermost but it is to be understood that the discs may be rotated on the shaft to dispose outermost any desired arcuate portion of the discs respectively. In Fig. 5 of the drawings an arcuate sector of the blue disc 10 is arranged outermost and extends from the leading edge 16 thereof to the leading edge 20 of the red disc 12. A substantially equal arcuate sector of the green disc 11 is arranged outermost which extends from the leading edge 18 thereof to the leading edge 16 of the blue disc 10, while a substantially equal arcuate sector of the red disc 12 is also arranged outermost which extends from the leading edge 20 thereof to the leading edge 18 of the green disc 11. The discs are so arranged on the shaft that the green disc 11 and the red disc 12 protrude through the sector opening 15 between the leading edge 16 and the trailing edge 17 of the blue disc 10. Approximately 120° therefrom the blue disc 10 and the green disc 11 protrude through the sector opening 15 in the red disc 12 between the leading edge 20 and the trailing edge 21 thereof, while approximately 120° therefrom the red disc 12 and the blue disc 10 protrude through the sector opening 15 in the green disc 11 between the leading edge 18 and the trailing edge 19 thereof. This construction permits of the turning of the discs respectively on the shaft with reference to each other so as to vary the relative portions of the discs disposed outermost.

The shaft 14 is journaled for rotation in a bearing in the upper end of a pedestal 23 with the inner end of the shaft protruding through the bearing and provided with a pulley wheel 24 over which is trained a belt 25 which operates about a relatively smaller pulley 26 mounted on the driven shaft 27 of an electric motor 28. The pedestal 23 and motor 28 are mounted in a fixed position on a base 29.

In order to provide means for adjusting the discs on the shaft 14 in order to vary the sectors or portions thereof which are disposed outermost, the pedestal is provided with an arm 30 projecting outwardly from the upper end thereof in parallel relation with the plane of the discs at the rear thereof. The arm 30 is provided with forwardly extending resilient thin spring fingers 31 which are located in longitudinally spaced relation along said arm and project forwardly from the forward edge thereof. The fingers 31 correspond in number to the number of discs and are slidably arranged in openings in the arm 30 for movement to project the outer ends thereof into intercepting relation with rearwardly extending projections 34 secured to the discs adjacent their trailing edges respectively and which are arranged in radial distances from the center of the shaft corresponding to the spacing of the fingers 31. The fingers 31 are normally disposed in retracted relation by means of springs 35 secured to the arm 30 and engaging the fingers adjacent the enlarged heads 36 thereof which heads are adapted to be manually grasped for projecting the fingers inwardly against the tension of said springs. The arm 30 is pivoted to the pedestal 23 on pivotal connection 37 to permit of swinging of the arm into parallel relation with the discs to an out-of-the-way position at the rear thereof.

In the form of the invention illustrated in Figs. 6 to 11 of the drawings, the device consists of a plurality of discs, three being shown in the embodiment illustrated which are respectively indicated by the reference characters 38, 39 and 40 and which are provided on the forward faces thereof with any desired color or shade such as blue, green and red as illustrated in the drawings.

The discs are centrally apertured as at 41 and are mounted on a sleeve 42 through which extends a fixed shaft 43 for rotatably mounting the sleeve thereon. The discs have frictional engagement with the sleeve for rotation therewith but which permits of the relative rotation of the discs with reference to the sleeve and with reference to each other. The discs each consist of a forward portion which forms a complete annulus having an edge 44 extending from the central aperture 41 to the periphery thereof. The portion of the disc 360 degrees from the edge 44 is disposed slightly rearwardly of the said edge portion and continues in the form of a spiral portion which decreases in width to the inner end 46 thereof.

The discs are mounted on the sleeve 42 so as to dispose a portion of the forward colored face of each of the discs outwardly as illustrated in Fig. 5 in connection with the previous form of the invention. While approximately equal arcuate sectors of the discs are shown, it is to be understood that the discs may be rotated on the sleeve to dispose any desired portions of the discs outermost. As illustrated in Fig. 11 in which substantially equal sectors of the discs are arranged outermost, the green disc and the red disc protrude through the space between the edge portion 44 of the blue disc and the spiral portion 48 thereof. Approximately 120 degrees therefrom the red disc and the blue disc protrude through the space between the edge portion 44 of the green disc and the spiral portion 47 thereof, while 120 degrees therefrom the blue disc and the green disc protrude through the space between the edge portion 44 of the red disc and the spiral portion 45 thereof.

The spiral portions 48, 47 and 45 of the blue, green and red discs respectively are arranged progressively outwardly toward the periphery thereof as shown in Fig. 11 of the drawings and are affixed to flanges 49, 50 and 51 of spool like members 52, 53 and 54 concentrically mounted on the shaft 43 for rotation about said shaft. The said spool like members are mounted for independent rotation with reference to each other and with reference to the shaft and for this purpose the confronting concentric faces of adjacent members and the confronting concentric faces of the innermost member 54 and the shaft 43 are formed with annular grooves or raceways 55 in which ball bearings 56 are arranged. The sleeve 42 and the shaft 43 have their confronting concentric faces formed with annular grooves or raceways 57 in which ball bearings 58 are arranged to thereby permit of free rotation of the sleeve with reference to the shaft.

The shaft 43 is mounted in fixed relation in spaced standards 61 and 62 secured to a base 63 and in order to rotate the spool like members the flanged inner ends 64, 65 and 66 thereof are formed with sprocket teeth on the peripheries thereof forming gears 67 about which sprocket chains 68 are trained. The said sprocket chains respectively engage about sprocket wheels 70, 71 and 72 mounted on shafts 73, 74 and 75 journaled for rotation in standards 76, 77 and 78 respectively. The said shafts have gears 79, 80 and 81 keyed thereon respectively which are driven by means of a motor 82 with intermediate gears 83 and 84 arranged between adjacent gears for turning the gears in the same direction and likewise turning the spool like members and the discs in the same direction.

The gears 70, 71 and 72 are formed on the outer ends of elongated hubs 85, 86 and 87 respectively which hubs are frictionally fitted on the shafts 73, 74 and 75 respectively for rotation therewith but which permits of relative movement of the hubs with reference to the shafts in order to adjust the discs 38, 39 and 40 on the sleeve 42 to thereby vary the relative portions of the discs disposed outermost. In order to rotate the hubs 85, 86 and 87 with reference to the shafts 73, 74 and 75 respectively, the hubs are formed with enlarged bores extending inwardly from the outer ends thereof respectively to the portions thereof which frictionally engage the shafts to thereby provide a circumferential space or clearance between the enlarged bore portions and the shafts respectively. Mounted on the shafts 73, 74 and 75 are cylindrical sleeves 88, 89 and 90 having their inner ends located within the enlarged bore portions of the hubs 85, 86 and 87 and provided with upstanding projections 91 at the inner ends thereof which extend through longitudinally extending slots 92, 93 and 94 formed in the hubs 85, 86 and 87 respectively to thereby connect the said sleeves with the hubs for rotation therewith. The shafts 73, 74 and 75 are provided with spiral guides such as guide grooves 95 which extend spirally a complete revolution about the shafts respectively and in which engage projections 97 formed on the inner peripheries of the sleeves 88, 89 and 90. The sleeves are formed with flanged outer ends 98 which extend between the furcations of bifurcated lower ends 99 of slide elements 100, mounted for sliding movement in slots 103, 104 and 105 respectively formed in an angulated support 106 secured to the base 63 with the upper portion thereof disposed in overlying relation with the outer ends of the shafts 73, 74 and 75. The slide elements 100 are formed with handle members 107 adapted to be grasped for manually moving the slide members longitudinally of the guide grooves 95 to thereby effect relative turning movement of the sleeves with reference to the shafts 73, 74 and 75 by the guided movement of the projections 97 in the grooves 95. The relative movement imparted to the sleeves produces relative movement of the hubs 85, 86 and 87 with reference to the said shafts during rotation thereof to thereby change the relative position of the discs 38, 39 and 40. Thus the handle members 107 may be selectively actuated to set any one of the discs 38, 39 and 40 in the desired exposed relation with reference to the other discs.

The intermediate gears 83 and 84 are journaled in standards 110 supported in upright relation on the base 63. The bifurcated lower ends 99 of the slide elements 100 are provided with inwardly extending projections 111 between which the flanges 98 of the sleeves 88, 89 and 90 slidably rotate with the movement of the gears 70, 71 and 72.

The discs in the forms of the invention illustrated are colored blue, green and red, but it is to be understood that the same may be of any desired color and for the purpose of practicing the invention black, white and grey are understood as colors which may be employed.

The discs in the form of the invention illustrated in Figs. 1 to 5 of the drawings are formed with a sector removed to provide an opening 15 and it is to be understood that said opening may be of any desired size to provide discs of any desired sector formation. The discs as illustrated in the drawings are of annular formation but it is to be understood that the invention is not limited thereto and the same may be of any desired formation having a surface rotatable about a central axis, such as cones, or cylinders, or portions thereof. The said members may be opaque or transparent or may have one or a plurality of colors on each forward face thereof, or the colors may be of any desired pattern.

What is claimed is:

1. In a device for displaying the component of a plurality of colors, a plurality of members having differently colored forward faces, a shaft on which said members are mounted for conjoint rotation with the members arranged so as to dispose a portion of the forward face of each member outermost and in substantially a common plane, said members being mounted on said shaft for independent rotation to permit of relative adjustment of the members with reference to each other, spools mounted for rotation on said shaft, means connecting said members and said spools respectively for movement of said members with the spools, a driving shaft for each of said spools, means operatively connecting said driving shafts with said spools respectively for turning the same, hubs fitting said shafts for rotation therewith and permitting of relative movement of the hubs with reference to the shafts respectively, sleeves mounted on said shafts respectively, interengaging spiral guides and projections formed on the sleeves and shafts for relative turning of the sleeves with reference to the shafts when the sleeves are moved longitudinally of the shafts, interengaging means connecting said hubs and sleeves respectively for turning of the sleeves therewith and permitting of movement of the sleeves longitudinally of the shafts, handle members engaging said sleeves for manually imparting reciprocatory movement thereto for retarding the movement of the hubs with reference to the driving shafts respectively to thereby vary the relative positions of the aforesaid members for varying the portions thereof disposed outermost at will during the rotation of the said members.

2. In a device for displaying the component of a plurality of colors, a plurality of differently colored members, a shaft on which said members are mounted for conjoint spinning with the members arranged so as to dispose a portion of the forward face of each member outermost and in substantially a common plane, said members being mounted on said shaft for independent rotation to permit of relative adjustment of the members with reference to each other, means connected with said colored members for spinning the same, cooperating elements rotatable with said spinning means and having interengageable spiral guide and projection for relative turning of one of said elements with reference to the other for rotating one of said colored members with reference to the other colored members, and one of said elements having longitudinal movement with reference to the other to thereby effect said relative rotation of one of said elements with reference to the other for changing the color component of the colored members during spinning thereof.

3. In a device for displaying the component of a plurality of colors, a plurality of differently colored members mounted for conjoint spinning with the members arranged so as to dispose a portion of the forward face of each member outermost and in substantially a common plane, each of said colored members being mounted for independent rotation to permit of relative adjustment of the members with reference to each other, means for imparting conjoint spinning to said members, and cooperating elements rotatable with said spinning means and having interengaging guide means for relative turning of one of said elements with reference to the other element upon movement of the other element longitudinally thereof for varying the relative position of one of said colored members with reference to the other colored members to thereby change the color component of said colored members during spinning thereof.

BRUNO LAMBERGER.

(References on following page)

REFERENCES CITED

The following references are of record in the file of this patent:

UNITED STATES PATENTS

| Number | Name | Date |
|---|---|---|
| 1,451,810 | Bower | Apr. 17, 1923 |
| 1,766,637 | Hopewell | June 24, 1930 |

FOREIGN PATENTS

| Number | Country | Date |
|---|---|---|
| 376,313 | France | June 8, 1907 |

OTHER REFERENCES

Catalogue of the C. H. Stoelting Co., Chicago, Illinois, entitled, "Psychological and Physiological Apparatus and Supplies," third edition, 1936, page 22.